J. L. COLE.
Thill Coupling.
No. 86,212.  Patented Jan. 26, 1869.
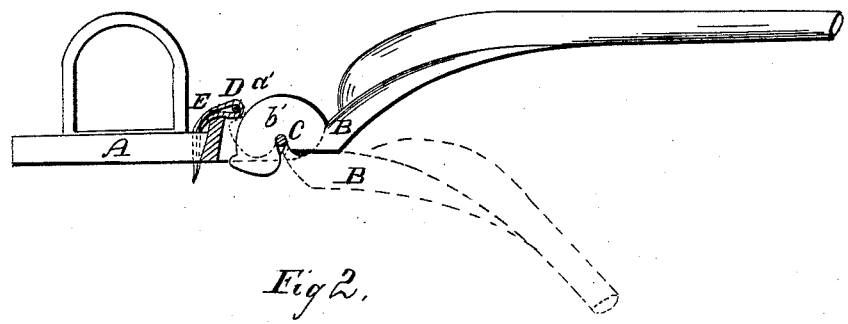
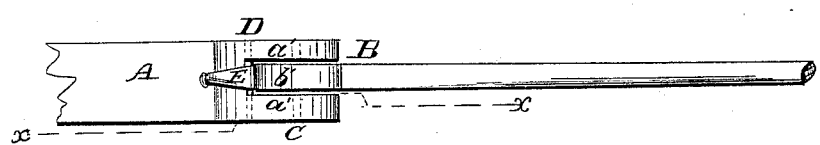
Witnesses  
Inventor  
J. L. Cole

JAMES L. COLE, OF COLUMBUS CITY, IOWA.

Letters Patent No. 86,212, dated January 26, 1869.

IMPROVED THILL-COUPLING.

The Schedule referred to in these Letters Patent and making part of the same.

*To all whom it may concern:*

Be it known that I, JAMES L. COLE, of Columbus City, in the county of Louisa, and State of Iowa, have invented a new and useful Improvement in Thill-Coupling; and I do hereby declare that the following is a full, clear, and exact description thereof, which will enable others skilled in the art to make and use the same, reference being had to the accompanying drawings, forming part of this specification, in which—

Figure 1 is a side view of my improved thill-coupling, partly in section through the line $x\,x$, fig. 2.

Figure 2 is a top view of the same.

Similar letters of reference indicate like parts.

My invention has for its object to furnish an improved coupling for connecting the thills or tongue of a buggy, or other carriage, to the forward axle, which shall be simple in construction, reliable in operation, not liable to get out of order, or to become accidentally uncoupled, and which may be easily detached when required, without its being necessary to unscrew nuts or remove bolts.

It consists in the construction, combination, and arrangement of the various parts of the coupling, as hereinafter more fully described.

A is the yoke of the clip, or coupling, which is secured to the axle of the carriage in the ordinary manner.

The forward end of the yoke A is slotted, or has ears, $a'$, formed upon it, to receive the hooked head of the thill-iron, B.

The ears $a'$, of the yoke A, have two bolts, C and D, passed through and secured to them, the one bolt, C, passing through the lower part of the forward end of the said ears, and the other, D, passing through the upper part of the rear ends of the said ears $a'$, the said two bolts being arranged, with respect to each other and the ears $a'$, in about the relative positions shown in fig. 1.

B is the thill-iron, the forward part or strap of which is attached to the thills, or cross-bar of the tongue, in the ordinary manner.

Upon the rear end of the thill-iron B is formed a head, $b'$, made in about the shape and manner shown in fig. 1, that is to say, with its top, or upper edge, curved or rounded off, as shown, and with a deep notch in the middle part of its lower edge, to receive the bolt C.

Upon the rear end of the head $b'$ is formed a small hook, or notched projection, to receive the upper and rear bolt, D, when the thill-iron is in certain positions.

When in the ordinary working-position, the rear part of the curved upper edge of the said head $b'$ rests against the bolt or pin D, which, together with the peculiar form of the head B, and the arrangement of the bolts C and D, renders it impossible for the coupling to become uncoupled when in use.

By passing a leather or rubber strap, E, around the upper bolt, D, all rattling of the coupling will be prevented.

To detach the coupling, the forward end of the thills or tongue is dropped to the ground. The rear end of the thill-irons B is then raised, until the hook upon the head $b'$ strikes against the bolt D. Using this bolt D as a fulcrum, the forward end of the thills or tongue is raised, and the uncoupling is effected.

To couple the coupling, the hook of the head $b'$ is placed beneath the upper bolt D, then, using this bolt as a fulcrum, the forward end of the thills or tongue is lowered to the ground, and the coupling is effected.

Having thus described my invention,

I claim as new, and desire to secure by Letters Patent—

The thill-iron, constructed with the notched and rounded head $b'$, adapted to be fitted between the bolts D C, arranged as described in the ears $a'$, of the yoke A, and to be attached and detached from said yoke, by moving, in the arc of a circle, around the bolt D, with its rearward-projecting hook in contact with said bolt, as herein shown and described.

JAMES L. COLE.

Witnesses:
JAMES GOBLE,
S. E. WILSON.